Figure 1:
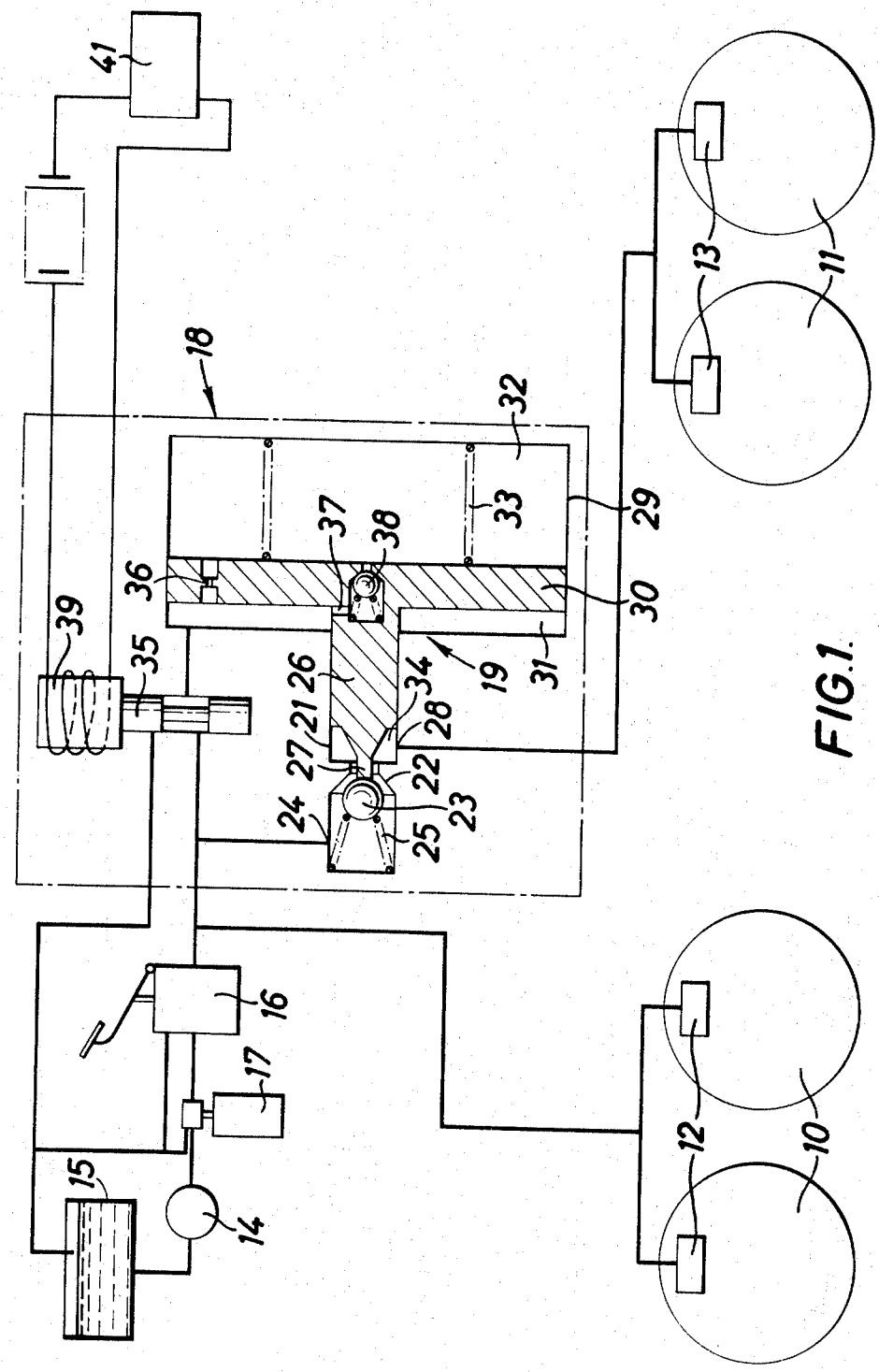

United States Patent [19]
Parsons

[11] 3,774,976
[45] Nov. 27, 1973

[54] ANTI-SKID CONTROL MEANS FOR LIQUID PRESSURE BRAKING SYSTEMS

[76] Inventor: David Parsons, Tachbrook Rd., Leamington Spa, England

[22] Filed: Feb. 4, 1972

[21] Appl. No.: 223,563

[52] U.S. Cl.............................. 303/21 F, 188/181 A
[51] Int. Cl............................................... B60t 8/12
[58] Field of Search............... 188/181 A; 303/21 F, 303/21 CG

[56] References Cited
UNITED STATES PATENTS

| | | | |
|---|---|---|---|
| 2,826,278 | 3/1958 | Highley | 188/181 A |
| 3,467,442 | 9/1969 | Davis | 188/181 A X |
| 3,666,328 | 5/1972 | Williams | 303/21 F |

*Primary Examiner*—Duane A. Reger
*Attorney*—Lawrence J. Winter

[57] ABSTRACT

Anti-Skid control means for liquid pressure vehicle brakes operated by pressure from a source controlled by a driver's valve in which skid sensing means control a valve to shut off brake motor cylinders from the pressure source and a plunger moving to increase the volume of the shut-off part of the system, the plunger moving in a first chamber, in which braking system pressure acts on it to maximise the volume of said chamber and normally being held against such pressure by the opposing action of a spring and of the source pressure acting on a movable wall, the fluid pressure providing the said opposing action being produced by fluid in a second chamber which is normally connected to the pressure source and is connected to a low pressure reservoir by operation of the skid sensing means, there being provided, for the passage of liquid between said second chamber and said pressure source and drain, a flow-restricting device and means to provide for flow of liquid in the outward direction from said second chamber, at a rate not controlled by said flow restricting device.

11 Claims, 7 Drawing Figures

ANTI-SKID CONTROL MEANS FOR LIQUID PRESSURE BRAKING SYSTEMS

This invention relates to anti-skid control means for liquid pressure braking systems of vehicles in which liquid pressure derived from a source at which such pressure is constantly available when the vehicle is in operation, such as an engine-driven pump, is applied by the operation of a valve under the control of the vehicle driver, to motor cylinders acting to apply rakes to wheels of the vehicle, sensing means responsive to conditions preliminary to skidding of the vehicle wheels being provided to control the actual pressure acting in the motor cylinders in such a way that the said actual pressure is reduced automatically when a tendency to skid is sensed and is restored automatically to a value determined by the driver-controlled valve when the tendency to skid ceases.

It is the object of the present invention to provide anti-skid control means in which the rate of change of the pressure acting to apply the brakes during operation of the anti-skid control means is controlled, at least during the restoration of the pressure when the tendency to skid ceases.

According to the present invention there are provided anti-skid control means for a liquid pressure braking system of a vehicle of the kind in which liquid pressure derived from a source at which such pressure is constantly available when the vehicle is in operation is applied by the operation of a valve under the control of the vehicle driver to motor cylinders acting to apply brakes to wheels of the vehicle, sensing means responsive to conditions preliminary to skidding of the vehicle wheels being provided to control the actual pressure acting in the motor cylinders in such a way that the said actual pressure is reduced automatically when a tendency to skid is sensed and is restored automatically to a value determined by the driver-controlled valve when the tendency to skid ceases, and in which there are provided between the driver-controlled valve and at least some of said motor cylinders, a shut-off valve closable to prevent flow of liquid from the source of pressure to said motor cylinders and, between said shut-off valve and the motor cylinders, a first chamber in which is movable a plunger operative to vary the volume of said chamber, said shut-off valve being urged towards the closed position and said plunger being urged in a direction to maximise the volume of said chamber by liquid pressure in the braking system and said shut-off valve and plunger being normally held against movement by said liquid pressure in the braking system by the opposing action of a spring and of fluid pressure from the pressure source acting on a movable wall, characterised in that the fluid pressure providing the said opposing action is produced by fluid in a second chamber which is normally connected to the pressure source and is connected to a low pressure reservoir by operation of the skid sensing means, there being provided, for the passage of liquid between said second chamber and said pressure source and drain, a flow-restricting device and means to provide for flow of liquid in the outward direction from said second chamber at a rate not controlled by said flow-restricting device.

The said means to provide for flow of liquid not controlled by said flow restricting device may comprise a passage in parallel with said flow-restricting device and controlled by a one-way valve, or may comprise means for increasing the effective area of the liquid flow path through the flow restricting means.

Variable flow restricting means may be provided in series with the one-way valve to provide varying restriction of flow through said passage as liquid escapes from said second chamber.

The flow restricting device may lead from the second chamber into a third chamber on the opposite side of the movable wall to said second chamber, the connections of said second chamber to the pressure source and to the low pressure reservoir being provided through said third chamber.

A valve controlled by the skid-sensing device may be provided to connect said second chamber alternatively to said pressure source and to said low pressure reservoir.

Alternatively, the third chamber may be connected to the source of pressure through flow-restricting means and may be connectable to the low pressure reservoir through a valve controlled by the skid-sensing device.

There will now be described, by way of example, some embodiments of anti-skid control means according to the invention, and, in the accompanying drawings:

FIG. 1 is a diagram of a liquid pressure vehicle braking system embodying the invention; and FIGS. 2, 3, 4, 5, 6 and 7 are diagrams corresponding to the part of FIG. 1 enclosed within a chain-dotted line, showing modified arrangements of the anti-skid control means according to the invention.

Referring to FIG. 1 of the drawings, brakes on front wheels of a vehicle are shown at 10 and brakes on rear wheels of the vehicle at 11, the brakes 10 and 11 being operated by liquid pressure acting in motor cylinders 12 and 13 respectively. Liquid pressure for operating the brakes may be generated in any suitable manner, for example by a pump 14, which may be driven by the vehicle engine as is well known in such braking systems, the pump drawing liquid from a reservoir 15 and supplying it to a liquid pressure accumulator 17 from which liquid under pressure is supplied to the brakes through a driver-operated control valve 16.

In the braking system shown in FIG. 1 the front brake motor cylinders 12 are directly connected to the driver-controlled valve 16, so that the pressure acting in those motor cylinders is controlled only by the said valve, but the rear brake motor cylinders 14 are connected to the said valve 16 through anti-skid control means generally indicated by the reference 18 and enclosed within a chain-dotted rectangle in FIG. 1. It will be understood that the anti-skid control means can be arranged to control motor cylinders actuating all the brakes of a vehicle, or any selected group of brakes, or separate anti-skid control means can be provided to control motor cylinders operating individual brakes or groups of brakes.

The anti-skid control means comprises a unit 19 provided with a bore 21 in which is formed a seat 22 for a ball valve 23, one end of the bore 21 being connected at 24 to the driver-controlled valve 16 and the ball valve 23 being on the side of the seat 22 adjacent that end of the bore so that the pressure from the pump 14, when the driver-controlled valve 16 is actuated to apply the brakes, tends to seat the ball valve 23. A light spring 25 is also provided to urge the ball valve 23 towards its seat 22. A plunger 26 slidable in the other end of the valve bore 21 carries a pin 27 which extends through the valve seat 22 to engage the ball valve 23, and the brake motor cylinders 13 are connected to the bore 21 at 28 between the valve seat 22 and the end of the plunger 26 from which the pin 27 extends. The end of the bore 21 in which the plunger 26 is slidable opens into a coaxial cylinder 29 of substantially greater diameter than the said bore 21, in which cylinder 29 is slidably mounted a piston 30 moving as one with the plunger 26. The piston divides the cylinder 29 into two chambers 31 and 32. The chamber 31, is on the side of the piston 30 from which the plunger 26 projects, the chamber 32 being on the side of the piston 30 remote from the plunger 26. A spring 33 in the chamber 32 acts on the piston 30 to provide a thrust acting to unseat the ball valve 23 and urge the plunger 26 towards the valve seat 22, thereby reducing the volume of the space in the bore 21 between the valve seat 22 and said plunger 26.

The part of the bore 21 between the seat 22 and the adjacent end of the plunger 26 forms a variable volume chamber hereinafter referred to as the first chamber 34, whilst the chamber 32 is hereinafter referred to as the second chamber.

The driver-controlled valve 16, as well as being permanently connected to the bore 21 at 24, is also normally connected, through a valve 35, to the chamber 31 in the cylinder 29, and an orifice 36 is provided in the piston 30 which constitutes a flow-restricting connection between the second chamber 32 and the chamber 31. There is also provided, in a passage 37 formed in the piston 30 and connecting the said two chambers, a one-way valve 38 which allows flow of liquid from the second chamber 32 to the chamber 31, but not flow in the opposite direction. The valve 35, which is controlled by a solenoid 39 energised by an electrical signal from a skid-sensing device 41, closes off the connection of the chamber 31 to the driver-controlled valve 16 when a signal is produced by operation of the skid-sensing device due to a tendency of the vehicle to skid, and connects the said chamber 31 to the reservoir 15. Skid sensing devices providing electrical signals are well known and no such device will be specifically described herein.

The braking system described with reference to FIG. 1 operates as follows.

When the driver-controlled valve 16 is actuated to apply the brakes, liquid pressure is built up in the motor cylinders 12 to apply the front brakes and in the motor cylinders 13 to apply the rear brakes, pressure corresponding to that in the rear brake motor cylinders 13 being also built up in the first chamber 34. Liquid pressure is also built up in both the chamber 31 and the second chamber 32 since the chamber 31 is connected to the first chamber 34 through the valve 35, and the second chamber 32 is connected to the chamber 31 through the orifice 36 and the pressures in the said two chambers remain equal one to the other. The piston/plunger assembly 26, 30 is therefore in liquid pressure balance since the area of the piston 30 exposed in the second chamber 32 is equal to the sum of the area of the piston 30 exposed in the chamber 31 and the area of the plunger 26. The spring 33 in the second chamber 32 therefore holds the ball valve 23 open.

When a skid is sensed, the valve 35 controlled by the skid sensing device isolates the chamber 31 from the pressure source and connects it to the reservoir 15 so that the pressure drops in the said chamber 31 and liquid passes into the said chamber from the second chamber 32 both through the flow restricting orifice 36 and through the one-way valve 38, so that the pressure also falls rapidly in the second chamber 32, and the pressure acting on the plunger 26 in the first chamber 34 moves it to allow the ball valve 23 to close, isolating the brake motor cylinders 13 from the pressure source. The movement of the plunger 26, which continues after the ball valve 23 has closed, increases the volume of the chamber 34 in the bore 21 between the valve seat and the plunger, and so reduces the pressure acting in the motor cylinders 13 to allow the brakes 11 to be released, thereby removing the tendency of the braked wheels to skid. As soon as the tendency to skid has been removed, the sensing device 41 allows the valve 35 controlled thereby to return to its normal position, re-connecting the chamber 31 to the pressure source. The pressure in the chamber 31 is now greater than that in the second chamber 32, so that the one-way valve 38 closes, and liquid passes to the second chamber 32 only through the flow restricting orifice 36. Pressure is therefore built up gradually in the second chamber 32 to move the piston 30 and plunger 26 to reduce the volume of the first chamber 34 and eventually to open the ball valve 23, so that the brake applying pressure in the motor cylinders 13 is built up gradually to re-apply the brakes. The gradual reapplication of the brakes reduces the tendency for the wheels to again commence to skid. The effective area of the passage 37, when the one-way valve is open, is substantially greater than the effective area of the flow-restriction orifice 36, and so determines effectively the rate of escape of liquid from the chamber 32 and the rate of release of the brakes.

Figure 2:
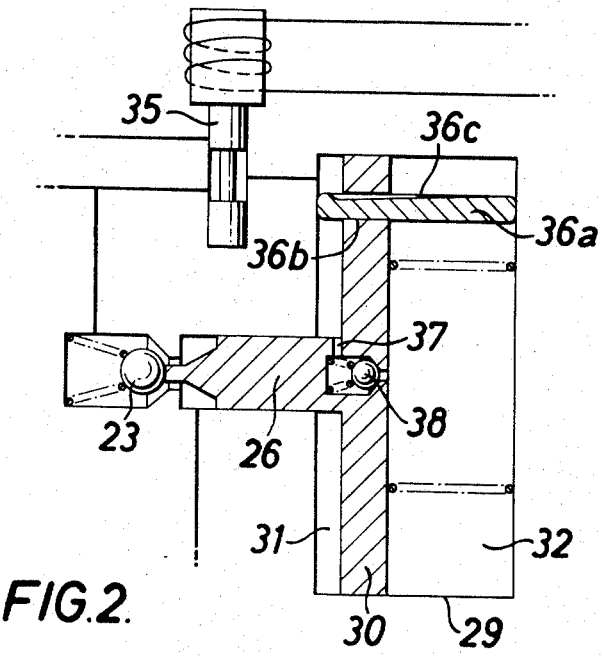

In the arrangement shown in FIG. 1, the restriction offered to flow of liquid from the chamber 31 into the second chamber 32 during the restoration of braking is constant, being determined by the fixed orifice 36. It may be found preferable to provide a rate of restriction which varies with the position of the piston 30, for which purpose, as shown in FIG. 2, a pin 36a may be provided which fits closely and is slidable in a hole 36b in the piston 30. The pin 36a which abuts at its ends on the end walls of the cylinder 29 so as to be fixed against axial movement relative thereto, is formed with a longitudinal flat 36c, or a longitudinal groove, to provide the flow restricting passage between the chambers 31 and 32. The flat or groove may be longitudinally inclined to provide progressive change of the area of the flow restricting passage with piston movement and/or may be stepped to provide an abrupt change at any chosen piston position. Thus the initial restoration of braking may be relatively rapid, followed by a slower build-up to maximum braking, or the initial restoration of braking may be relatively slow, followed by a rapid build-up to the maximum value, or any other desired characteristic may be provided.

Figure 3:
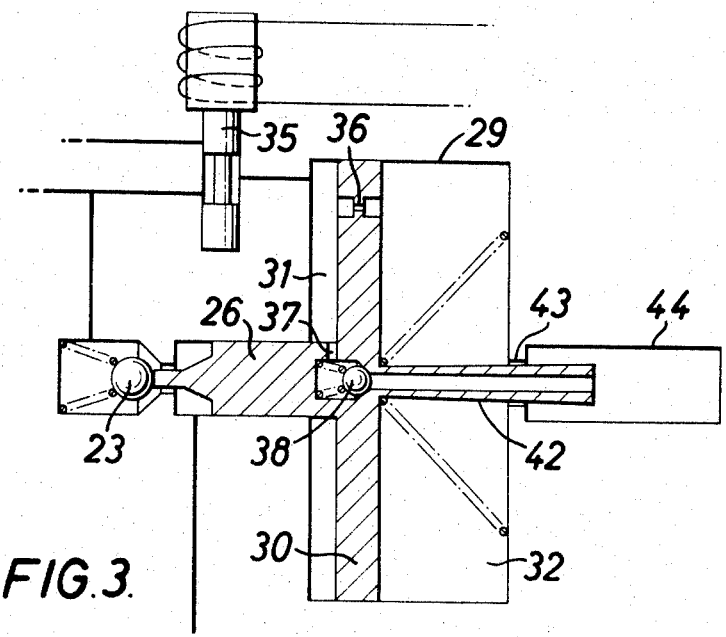

In the arrangements described with reference to FIGS. 1 and 2, the release of pressure from the second chamber 32 when the brakes are released following the sensing of a skid, being dependent effectively on flow through a passage of fixed area, commences at a relatively high rate and decreases rapidly as the pressure difference between the chambers 32 and 31 decreases. To provide a more even rate of pressure release, a variable flow restriction may be provided in series with the one-way valve 38. For example, as shown in FIG. 3, the piston 30, as well as being provided with a fixed flow restricting orifice 36 and a passage 37 controlled by a one-way valve 38, may have a tubular stem 42 mounted co-axially thereon with its bore connected at one end by the passage 37 to the chamber 31, the stem 42 extending through the second chamber 32 and through an orifice 43 in the end wall thereof into a further chamber 44, into which the other end of the bore in the said stem opens. The tubular stem 42 may, as shown be externally tapered so as to decrease in diameter towards the piston 30 and provide a clearance space between itself and the wall of the orifice 43 in the end wall of the second chamber 32 which space increases as the piston 30 moves towards that wall.

Thus, when the valve 35 controlled by the sensing device 41 is operated as the result of a skid being sensed, liquid passing from the second chamber 32 through the one-way valve 38 first passes through the clearance space around the stem 42 into the further chamber 44, then through the bore of the stem 42 and through the one-way valve 38 to the chamber 31, the restriction of flow through the clearance space decreasing as the piston moves to reduce the volume of the second chamber 32, so that the total restriction of flow decreases as the pressure difference between the two chambers falls, and the pressure in the chamber 32 decreases at a more even rate. The external surface of the stem 42, instead of being tapered as described above, may be tapered in the reverse direction, or stepped, to provide any desired damping characteristic.

Figure 4:
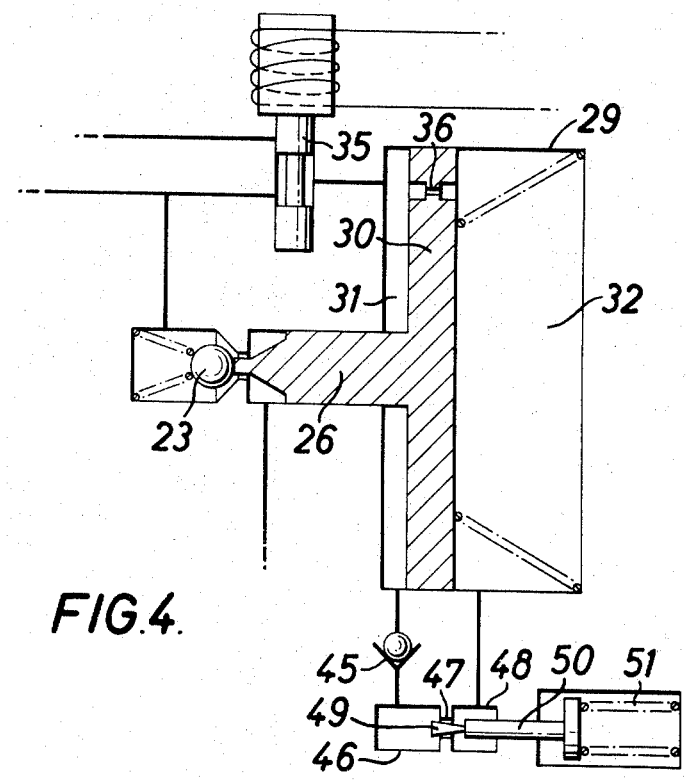

The arrangement shown in FIG. 4, like the arrangement shown in FIG. 3, provides a variable restriction of flow through the flow path between the chambers 32 and 31 including the one-way valve. In this arrangement, however, the degree of such restriction of flow depends on the pressure in the chamber 32 instead of on the position of the piston 30. Although the one-way valve and variable flow restricting device may be carried by the piston 30 as in the arrangement of FIG. 3, they are shown in FIG. 4 as being mounted externally of the cylinder 29, the one-way valve 45 being mounted in a conduit leading from the chamber 31 into a cavity 46 from which an orifice 47 leads to another cavity 48 connected to the chamber 32. A profiled needle 49 movable axially in the orifice 47, and varying in cross-sectional area is carried by a plunger 50 projecting into the cavity 48 and urged by a spring 51 in a direction opposite to that in which it is urged by pressure in the cavity 48, which pressure corresponds to that in the chamber 32. Thus, since liquid pressure in the cavity 48 decreases as the liquid flows out of the chamber 42, the flow restriction varies as the pressure in the chamber 42 falls, and a controlled rate of pressure release from the chamber 32 is provided, resulting in a controlled rate of drop of pressure in the braking system.

The needle 49 is shown in FIG. 4 as being tapered so that the flow restriction decreases as the pressure in the chamber 32 falls, but other needle shapes providing other characteristics may be used.

Figure 5:
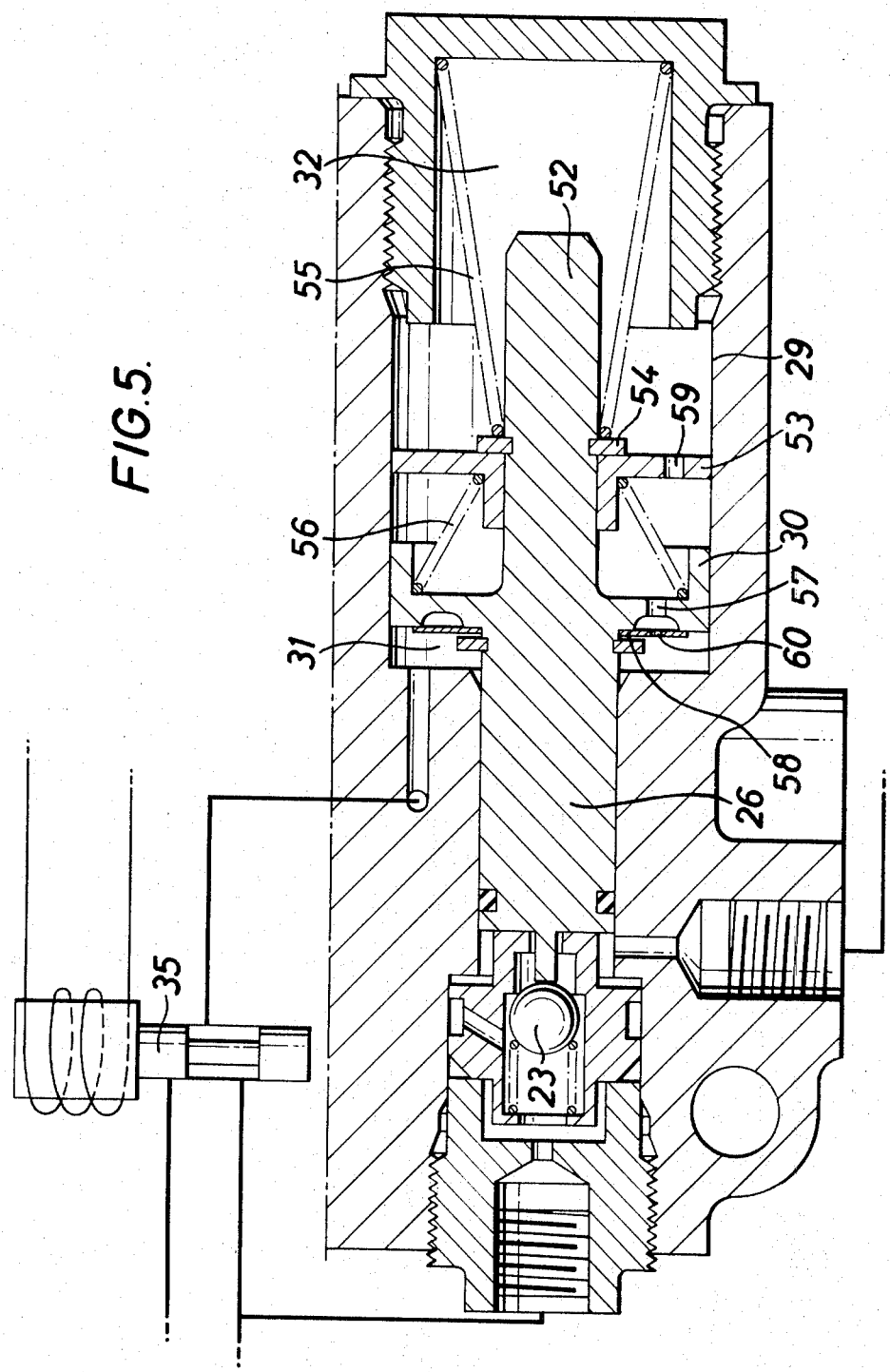

FIG. 5 of the drawings shows a form of anti-skid control means according to the invention in which a rapid initial movement of the plunger 26 takes place when a skid is sensed, to ensure quick initial release of the brakes, and further movement of the plunger 26 to further reduce the pressure in the brake operating motor cylinders is controlled to restrict the rate at which the pressure falls. The plunger 26, as in the previously described arrangements, is fixed to a piston 30 slidable in a cylinder 29, the piston 30, in this arrangement, having a stem 52 extending therefrom in the opposite direction to the plunger 26 so as to extend into the second chamber 32. Slidably mounted on the stem 52 is a floating piston 53 movable relative to the piston 30, between a position in which it engages the said piston 30 and a position in which it engages a clip ring 54 mounted on the stem 52. The clip ring 54 also provides an abutment for a return spring 55 acting on the piston 30 and plunger 26 in the same manner as the return spring 33 in FIG. 1. A light spring 56 acting between the piston 30 and the floating piston 53 urges the latter towards the clip ring 54.

An orifice 57 in the piston 30, is controlled by a flutter plate 58 so as to provide a one-way valve allowing liquid to pass freely from the space between the piston 30 and the floating piston 53 into the chamber 31, the flutter plate 58 being formed with a small orifice 60 to allow restricted flow of liquid in the opposite direction. A flow-restricting orifice 59 is provided in the floating piston 53, the orifice 59 normally being of larger area than the orifice 60.

When the brakes are applied, the parts are in the positions shown in FIG. 5 so long as no tendency to skid is sensed, but if a tendency to skid occurs and the solenoid valve 35 is operated, the chamber 31 is connected to the low pressure reservoir of the system. Liquid can now escape from the chamber 32 past the flutter plate 58, allowing the piston 30 and plunger 26 to move and permit closing of the ball valve 23. During the initial movement of the piston 30, the floating piston 53 tends to lag behind the piston 30, due to the resistance to liquid flow through the orifice 59. Since, during this movement of the piston 30, the stem 52 tends to displace liquid from the part of the chamber 32 on the side of the floating piston remote from the main piston, the said main piston and the floating piston rapidly approach each other until they come into contact, after which they move together as one, the transfer of liquid past this piston combination being restricted by the orifice 59 although the flutter plate offers no resistance to such flow. Thus the rate of release of the brakes is controlled by the orifice 59 once the main piston 30 and floating piston 53 have come into contact.

When the skid ceases, and the solenoid valve 35 again connects the chamber 31 to the pressure source, the plunger 26 and piston 30 return under the action of the spring 55 and the pressure transferred from the chamber 31 to the chamber 32 through the orifice in the flutter plate 58, this orifice restricting the flow of liquid so as to control the rate of re-application of the brakes in the same way as does the orifice 36 in FIGS. 1, 3 and 4. The floating piston returns, under the influence of the spring 56 to its position in which it is in contact with the clip ring 54.

Figure 6:
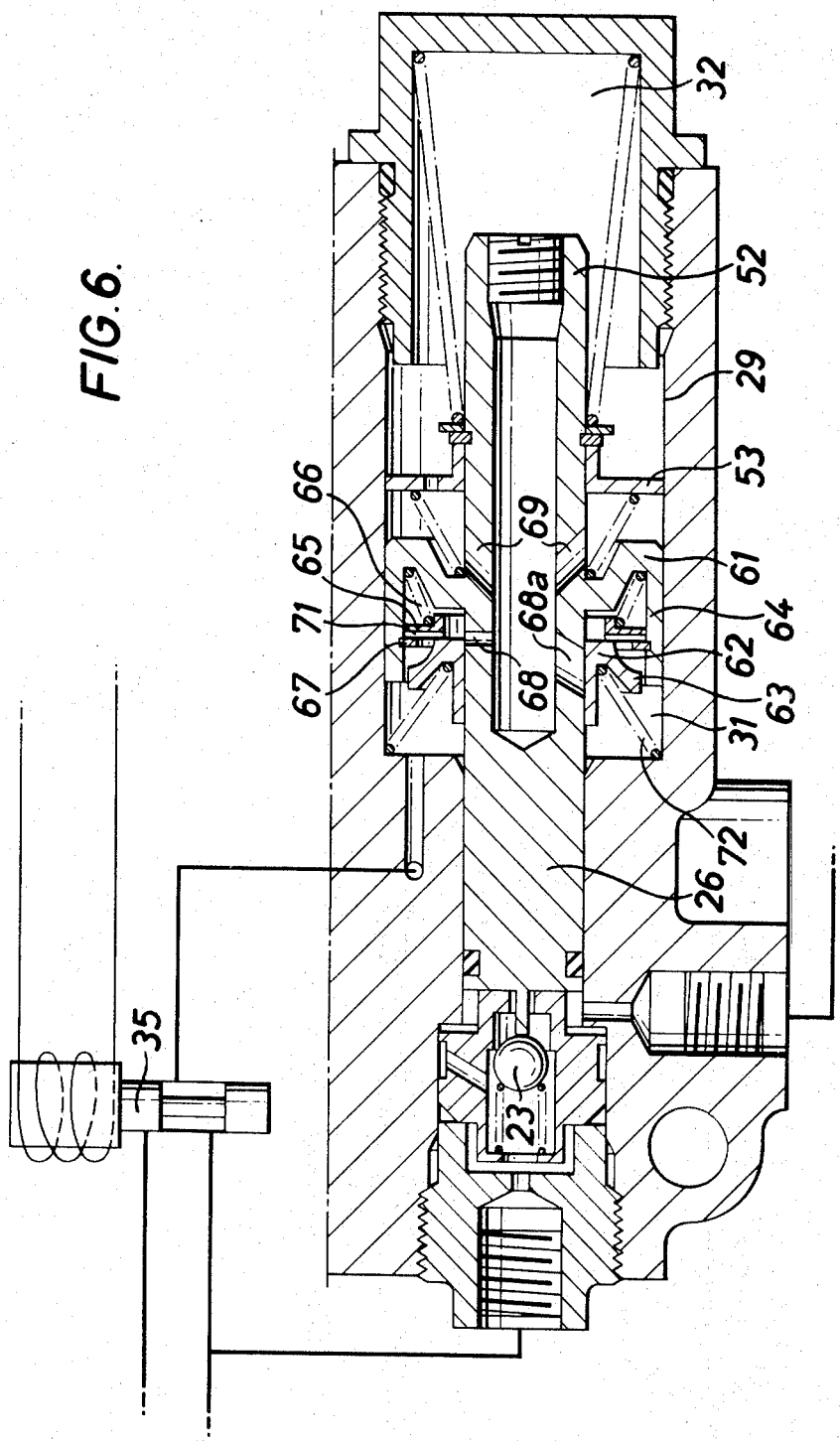

The arrangement shown in FIG. 6, like that shown in FIG. 5, includes a floating piston 53 similar to that shown in FIG. 5 and cooperating in a similar manner with a main piston, but means different from those shown in FIG. 5 are provided for controlling the flow of liquid past the main piston, with the object of obtaining a substantially constant rate of return of the plunger 26 when a tendency to skid ceases.

In the arrangement of FIG. 6 the main piston, which is shown at 61, is cup shaped, with its open end facing the chamber 31, and a valve sleeve 62 slidable on the plunger 26, is formed with a skirt 63 the edge of which has a diameter slightly smaller than the internal diameter of the piston skirt 64, the clearance between the piston skirt 64 and the plunger skirt 63 providing a flow restriction controlling flow of liquid from the chamber 31 to the chamber 32. A washer 65 urged, by a spring 66 taking its abutment on the piston 61, against a clip ring 67 mounted in the piston, normally locates the sleeve 62 in a position in which the edge of the skirt 63 lies partially within the piston skirt 64 and the sleeve to a great extent covers a radial port 68 in the plunger 26 and which leads to an axial bore in the said plunger 26 and in the stem 52 carrying the floating piston, the bore being also connected to the part of the chamber 32, between the main piston 61 and the floating piston 53, by radial ports 69. A further radial port 68a in the plunger 26, wholly covered by the sleeve 62 when the latter is in the position above referred to, connects the axial bore in the plunger to the interior of the main piston 61 when the valve sleeve 62 moves away from the washer 65. The washer 65 is grooved radially at 71 to permit free passage of liquid past it. The sleeve 62 is urged against the washer 65 by a spring 72 taking its abutment on the end wall of the cylinder 30 in the chamber 31.

FIG. 6 shows the parts in their normal positions which they occupy when the brakes are applied and operating normally, no tendency to skid having been sensed. When a skid is sensed, the solenoid valve 35 is operated as previously described, connecting the chamber 31 to the low pressure reservoir of the system, and the liquid pressure in the chamber 31 falls so that liquid tends to flow thereinto from the chamber 32 through the ports 69 and 68 and through the clearance between the skirts 63 and 64. This flow of liquid due to the restriction of flow through said clearance, tends to urge the sleeve 62 away from the main piston 61, increasing that clearance and substantially eliminating its effect as a flow restricting device, whilst increasing the exposure of the port 68 and opening the port 68a.

The floating piston 53 acts in the manner described with reference to FIG. 5 to determine the rate of movement of the piston 61 once the two pistons have come into contact with each other.

When the skid ceases, and the chamber 31 is again connected to the pressure source, the sleeve 62 is urged into contact with the washer 65, thus closing the port 68a and materially reducing the effective area of the port 68, the restriction of flow at the clearance between the skirts 63 and 64 controlling the position of the sleeve 62 relative to the port 68 so as to maintain the flow of liquid back into the chamber 32 at a substantially constant rate to restore the pressure in the brake motor cylinders and re-open the valve 23.

Instead of providing clearance between the skirts 62 and 64, they may be substantially in contact, a restricted flow path being provided by a hole in the skirt 63.

In the arrangements shown in FIG. 6 the rate of return of the plunger 26 is determined mainly by the rate of liquid flow past the main piston 61 and is largely independent of the pressure in the braking system.

Figure 7:
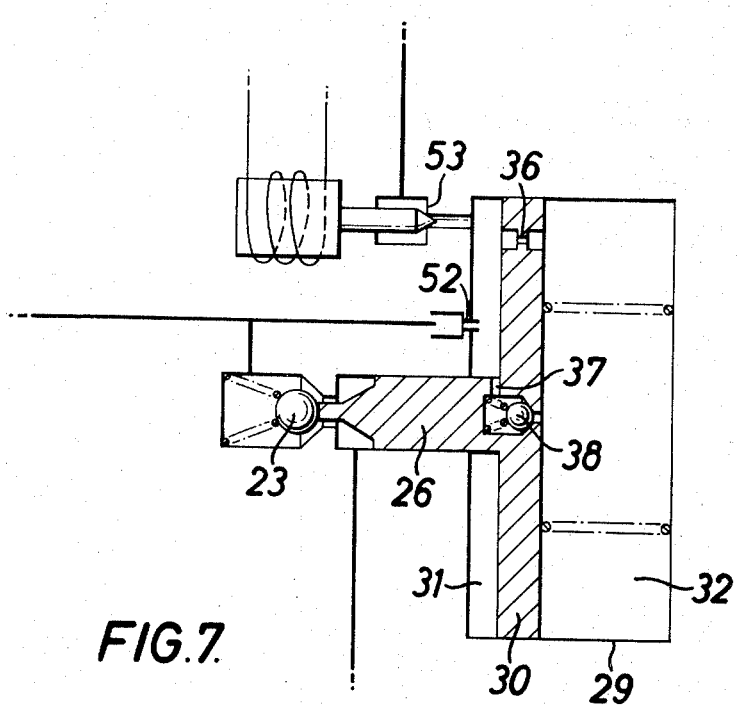

Referring now to FIG. 7 of the drawings, the ball valve 23, plunger 26, piston 30 and cylinder 29 are as described with reference to FIG. 1, the piston 30 having therein a flow restricting orifice 36 and a passage 37 controlled by a one-way valve 38 as described with reference to FIG. 1. However, in this arrangement, the driver-controlled valve 16 instead of being connected to the cylinder chamber 31 through a valve controlled by the skid-sensing device, is connected directly to that chamber through a flow restricting device 52, and a valve 53, controlled by the skid sensing device so as to be normally closed but to be opened when a skid is sensed, provides, when open, a connection between the chamber 31 and the low pressure reservoir of the system. The valve 53, when open, allows liquid to escape from the chamber 31 more rapidly than it can flow into that chamber through the flow restricting device, thus enabling the piston 30 to move the plunger 26 to release the brakes. When the valve 53 is re-closed to allow the brakes to be re-applied, the restriction of admission of liquid to the chamber 31, by determining the rate of build-up of pressure in the chamber 31 and therefore also in the chamber 32, controlling the rate at which the brakes are re-applied after being released due to the action of the skid-sensing device.

I claim:

1. Anti-skid control means for liquid pressure braking system of a vehicle of the kind in which liquid pressure derived from a source at which such pressure is constantly available when the vehicle is in operation, is applied by the operation of a valve under the control of the vehicle driver to motor cylinders acting to apply brakes to wheels of the vehicle, sensing means responsive to conditions preliminary to skidding of the vehicle wheels being provided to control the actual pressure acting in the motor cylinders in such a way that the said actual pressure is reduced automatically when a tendency to skid is sensed and is restored automatically to a value determined by the driver-controlled valve when the tendency to skid ceases, and in which there are provided, between the driver-controlled valve and at least some of said motor cylinders, a shut-off valve closable to prevent flow of liquid from the source of pressure to said motor cylinders and, between said shut-off valve and the motor cylinders, a first chamber in which is movable a plunger operative to vary the volume of said chamber, said shut-off valve being urged towards the closed position and said plunger being urged in a direction to maximise the volume of said chamber by liquid pressure in the braking system and said shut-off valve and plunger being normally held against movement by said liquid pressure in the braking system by the opposing action of a spring and of fluid pressure from the pressure source acting on a movable wall, wherein the fluid pressure providing the said opposing action is produced by fluid in a second chamber which is normally connected to the pressure source and is connected to a low pressure reservoir by operation of the skid sensing means, there being provided, for the passage of liquid between said second chamber and said pressure source and drain, a flow-restricting device and means to provide for flow of liquid in the outward direction from said second chamber, at a rate not controlled by said flow restricting device, comprising a passage in parallel with said flow-restricting device and controlled by a one-way valve.

2. Anti-skid control means for a liquid pressure braking system of a vehicle of the kind in which liquid pressure derived from a source at which such pressure is constantly available when the vehicle is in operation, is applied by the operation of a valve under the control of the vehicle driver to motor cylinders acting to apply brakes to wheels of the vehicle, sensing means responsive to conditions preliminary to skidding of the vehicle wheels being provided to control the actual pressure acting in the motor cylinders in such a way that the said actual pressure is reduced automatically when a tendency to skid is sensed and is restored automatically to a value determined by the driver-controlled valve when the tendency to skid ceases, and in which there are provided, between the driver-controlled valve and at least some of said motor cylinders, a shut-off valve closable to prevent flow of liquid from the source of pressure to said motor cylinders and, between said shut-off valve and the motor cylinders, a first chamber in which is movable a plunger operative to vary the volume of said chamber, said shut-off valve being urged towards the closed piston and said plunger being urged in a direction to maximise the volume of said chamber by liquid pressure in the braking system and said shut-off valve and plunger being normally held against movement by said liquid pressure in the braking system by the opposing action of a spring and of fluid pressure from the pressure source acting on a movable wall, wherein the fluid pressure providing the said opposing action is produced by fluid in a second chamber which is normally connected to the pressure source and is connected to a low pressure reservoir by operation of the skid sensing means, there being provided, for the passage of liquid between said second chamber and said pressure source and drain, a flow-control device at least partially preventing flow of liquid into said second chamber while providing substantially free flow out of said chamber.

3. Anti-skid control means according to claim 1, wherein the said means to provide for flow of liquid not controlled by said flow-restricting means comprise means for increasing the effective area of the liquid flow path through the flow restricting means.

4. Anti-skid control means according to claim 1, wherein variable flow restricting means are provided in series with the one-way valve to provide varying restriction of flow through said passage as liquid escapes from said second chamber.

5. Anti-skid control means according to claim 4, wherein the flow restricting device provides a degree of flow restriction which varies with the position of the plunger.

6. Anti-skid control means according to claim 5, wherein the flow restricting device leads from the second chamber into a third chamber on the opposite side of the movable wall to said second chamber, the connections of said second chamber to the pressure source and to the low pressure reservoir being provided through said third chamber.

7. Anti-skid control means according to claim 6, wherein a valve controlled by the skid-sensing device is provided to connect said second chamber alternatively to said pressure source and to said low pressure reservoir.

8. Anti-skid control means according to claim 6, wherein the third chamber is connected to the source of pressure through flow restricting means and is connectable to the low pressure reservoir through a valve controlled by the skid-sensing device.

9. Anti-skid control means according to claim 4, wherein the flow restricting means in series with the one-way valve provide a degree of restriction varying with the position of the movable wall in a cylinder defining said second chamber.

10. Anti-skid control means according to Claim 4, wherein the flow restricting means in series with the one way valve provide a degree of restriction varying with the pressure in said second chamber.

11. Anti-skid control means according to Claim 6, wherein the movable wall is a main piston fixed to the plunger movable to vary the volume of the first chamber, and a floating piston mounted in said second chamber and normally spaced from the main piston has an orifice formed therein.

* * * * *